United States Patent
Babcock et al.

(10) Patent No.: US 9,461,897 B1
(45) Date of Patent: Oct. 4, 2016

(54) MONITORING AND ANALYSIS OF SOCIAL NETWORK TRAFFIC

(71) Applicant: United Services Automobile Association (USAA), San Antonio, TX (US)

(72) Inventors: Peter Babcock, San Antonio, TX (US); Don Franke, San Antonio, TX (US); Michael Scott McQuarrie, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 358 days.

(21) Appl. No.: 13/829,825

(22) Filed: Mar. 14, 2013

Related U.S. Application Data

(60) Provisional application No. 61/678,019, filed on Jul. 31, 2012.

(51) Int. Cl.
G06F 3/048 (2013.01)
H04L 12/26 (2006.01)
G06F 3/0481 (2013.01)
H04L 12/58 (2006.01)
G06F 17/30 (2006.01)

(52) U.S. Cl.
CPC ......... *H04L 43/045* (2013.01); *G06F 3/04817* (2013.01); *G06F 17/30864* (2013.01); *H04L 12/585* (2013.01); *H04L 51/12* (2013.01)

(58) Field of Classification Search
CPC H04L 51/12; H04L 12/585; G06F 17/30864
See application file for complete search history.

(56) References Cited

U.S. PATENT DOCUMENTS

| | | | | |
|---|---|---|---|---|
| 5,761,497 A | * | 6/1998 | Holt | G06F 17/274 |
| 8,943,145 B1 | * | 1/2015 | Peters | G06Q 50/01 709/206 |
| 2006/0031306 A1 | * | 2/2006 | Haverkos | H04L 51/28 709/206 |
| 2006/0053095 A1 | * | 3/2006 | Koch | G06F 17/30864 |
| 2007/0079379 A1 | * | 4/2007 | Sprosts | G06Q 10/107 726/24 |
| 2008/0168453 A1 | * | 7/2008 | Hutson | G06F 21/552 718/103 |
| 2010/0153112 A1 | * | 6/2010 | Phillips | G10L 15/22 704/257 |
| 2010/0287182 A1 | * | 11/2010 | Brooks | G06F 17/30628 707/769 |
| 2011/0093455 A1 | * | 4/2011 | Benyamin | H04L 12/58 707/723 |
| 2011/0145348 A1 | * | 6/2011 | Benyamin | G06Q 10/10 709/206 |
| 2012/0226916 A1 | * | 9/2012 | Hahn | G06Q 50/22 713/193 |
| 2013/0104049 A1 | * | 4/2013 | Johnston | G06F 21/604 715/741 |
| 2013/0282835 A1 | * | 10/2013 | Bates | H04L 51/12 709/206 |

* cited by examiner

*Primary Examiner* — Jeffrey A Gaffin
*Assistant Examiner* — Justin Lee
(74) *Attorney, Agent, or Firm* — Fish & Richardson P.C.

(57) ABSTRACT

A method of monitoring network traffic includes providing a processor and obtaining a list including a plurality of words. Each word having at least one metric associated therewith. The method also includes querying network traffic to obtain a set of messages including one or more of the plurality of words. The method further includes scoring, using the processor, the messages in the set of messages and displaying the messages, ranked by score, in a user interface.

19 Claims, 10 Drawing Sheets

| | 02/01/13-21:45 [age: 47] @JohnB [score: 31.96] | Remove all TROJANs MALWARE or VIRUS from all computers FREE Downloads and Information [URL] | |
|---|---|---|---|
| | 02/01/13-21:30 [age: 32] @Maggie [score: 29.24] | Delete all MALWARE TROJANs or VIRUS from your computers FREE Information and Downloads [URL] | |
| | 02/01/13-21:36 [age: 38] ddan [score: 27.36] | Cybercriminals regularly use blogs and other small web sites to serve spam and PHISHING pages And the Flashback MALWARE was in part distrubuted by infected span classproflinkWrapperspan classproflinkPrefix/spanahrefhttps://plusgooglecom/107188805613096811193 classproflink oid107188805613096811193WordPress/a/span blogs | |
| | 02/01/13-21:19 [age: 21] @ddmaster [score: 26.52] | debating a tweet outing all the vain neophytes that have been suckered by the someone is saying bad things abt U MALWARE/VIRUS forshame | |
| | 02/01/13-21:17 [age: 19] @ny54 [score: 20.58] | AfricanJewb: WordOnRoad destroy them MALWARE dudes post IP Address and upload there VIRUSes to [URL] | |
| | 02/01/13-21:27 [age: 29] @cowboys [score: 17.68] | Vexira AntiVIRUS Update 142790 released 051812 for 592 new MALWARE spyware and VIRUSes Vexira AntiVIRUS | |
| | 02/01/13-21:03 [age: 5] adm29 [score: 17.64] | MTrends 3 RATs Increasing Use of Publicly Avaliable MALWARE in Targeted ATTACKsbr / from Munition by Grady Summers | |
| | 02/01/13-21:50 [age: 52] Erin Doe [score: 17.22] | Hati keticka mengdownload Movie atau Software di PC kerana itu penyebab VIRUS tersebar Kadang Popup yang automatik terbuka masa melayari sesuatu website juga mengandungi Prishing VIRUS cubalah Gunakan AntiVIRUS yang protect internet security contohnya MALWAREbyte | |

Attack  Bomb  Botnet  Breach  DDOS  Exploit  Hack(er)  Keylogger  Luizsec  Malware 0-20 min   20-40 min   40-60 min

*Fig. 1*

| | | ID | Username | First | Last | Status | Comments |
|---|---|---|---|---|---|---|---|
| | | 1000123 | jane.doe | Jane | Doe | Benign | it appears to be someone else |
| | | 1000666 | jane.doe.1 | Jane | Doe | Issue | Issued takedown request |
| | | 19901 | cclaus | Chris | Claus | Private | unknown – cannot see content |
| | | 6688999 | claus56 | Chris | Claus | Benign | it appears to be someone else |
| | | 7760123 | theclaus56 | Chris | Claus | Issue | Issued takedown request |
| | | 995223 | jdoeman | John | Doe | Benign | it appears to be someone else |
| | | 1007766 | jd99 | John | Doe | Benign | it appears to be someone else |

*Fig. 7*

| Disposition | x |
|---|---|

| | |
|---|---|
| ID | 1000123 |
| Username | john.doe.10 |
| Status | --select-- |
| Comments | |
| Your ID | |

Save Disposition

*FIG. 9*

MONITORING AND ANALYSIS OF SOCIAL NETWORK TRAFFIC

CROSS-REFERENCES TO RELATED APPLICATIONS

This application claims priority to U.S. Provisional Patent Application No. 61/678,019 filed Jul. 31, 2012, entitled "Monitoring and Analysis of Social Network Traffic," the disclosure of which is hereby incorporated by reference in its entirety for all purposes.

BACKGROUND OF THE INVENTION

Customers demand more of the products and services they use than ever before. They insist that the companies they deal with on a regular basis provide them greater and greater levels of accuracy and more tailored service offerings. Companies configure and operate ever increasing numbers of computer systems to achieve this. Using sources of information that have traditionally been unavailable when servicing these customers is now expected.

SUMMARY OF THE INVENTION

The present invention relates generally to network systems. More specifically, the present invention relates to methods and systems for monitoring traffic on social networks and analyzing the traffic for a variety of applications. In an embodiment, the methods and systems discussed herein can be referred to as SNOODA, which is an acronym for Social Network Observe Orient Decide Act, which is inspired by the OODA loop concept used in warfare and military operations. As described herein, network traffic associated with social networks are monitored for a list of keywords. As the keywords are detected in the network traffic, a graphical user interface is utilized to display information about the network traffic, enabling system operators to improve network security and reliability.

According to an embodiment of the present invention, a method of monitoring network traffic is provided. The method includes providing a processor and obtaining a list including a plurality of words, each word having at least one metric associated therewith. In some embodiments, the list of words is referred to as a search word list. The method also includes querying network traffic to obtain a set of messages including one or more of the plurality of words, scoring, using the processor, the messages in the set of messages, and displaying the messages, ranked by score, in a user interface.

According to another embodiment of the present invention, a user interface for monitoring social media traffic is provided. The user interface includes an icon region including a set of icons, each icon associated with a search word and a message region including a set of ranked messages, each message including at least one of the search words in the search word list. The user interface also includes a source region including source icons associated with a social media source.

An embodiment of the invention provides a method for providing a list of suspect social network profiles. The method may include receiving a list of names of people to monitor and sending a request to at least one social network including at least one name from the list. In response to the request information from the social network including a plurality of profile identifiers may be received. Furthermore, the method may include determining a subset of the a plurality of profile identifiers as corresponding to suspect profiles. Finally, a list including information about the suspect profiles may be displayed.

Numerous benefits are achieved by way of the present invention over conventional techniques. For example, embodiments of the present invention provide methods and systems for monitoring and responding to network traffic to enhance system security and reliability, to monitor for brand damage, to detect breaches at supply chain partners, to protect the identity and reputation of personnel, to detect security trends and news, and to monitor for data leaks. These and other embodiments of the invention along with many of its advantages and features are described in more detail in conjunction with the text below and attached figures.

BRIEF DESCRIPTION OF THE DRAWINGS

FIG. 1 illustrates a graphical user interface suitable for use with embodiments of the present invention;

FIG. 7 illustrates a graphical user interface suitable for use with embodiments of the present invention;

FIG. 9 illustrates a graphical user interface suitable for use with embodiments of the present invention.

DETAILED DESCRIPTION OF SPECIFIC EMBODIMENTS

FIG. 1 illustrates a graphical user interface suitable for use with embodiments of the present invention. The tool illustrated in FIG. 1 can be referred to as the SNOODA Messages component of the SNOODA suite. Referring to FIG. 1, the left column of data provides a visual shorthand useful at several levels. An icon is shown for each keyword found in the message and the icons along with a verbal identifier are displayed, for example, in a bar at the bottom of the interface. The keyword is also highlighted in the message in some embodiments. In the embodiment illustrated in FIG. 1, up to three icons can be displayed although the present invention is not limited to this particular number and more or less can be displayed in other embodiments. In embodiments in which more than three keywords appear in the message, the keywords can be ranked and the top three icons can be displayed, for example. The keywords and the icons can be highlighted with colors to ease in identification as described in more detail throughout the present specification. One of ordinary skill in the art would recognize many variations, modifications, and alternatives.

Figure 10:
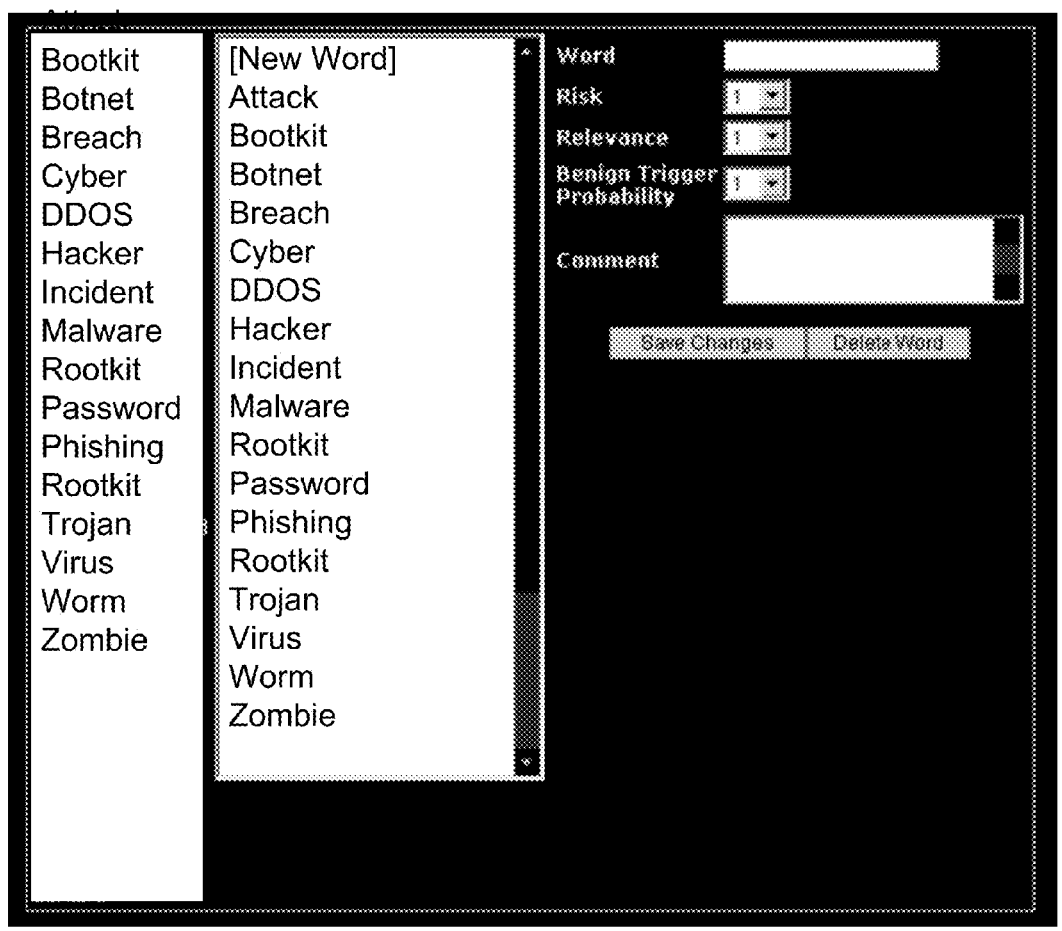
FIG. 10 is a high level illustration of a graphical user interface suitable for use in editing a list of keywords according to an embodiment of the present invention.

The keywords utilized in monitoring the network traffic can be maintained in a word list, which can be updated by one of several methods. FIG. 10 illustrates an interface for reviewing, editing, and updating the list of keywords. This interface is illustrated merely by way of example and is not intended to limit the present invention. One of ordinary skill in the art would recognize many variations, modifications, and alternatives.

The middle column in FIG. 1 illustrates a message board section of the interface on which messages retrieved from social networking sites (for example, but not limited to Facebook, Twitter, and Google+) that contain words found in the word watch list (i.e., the keyword list). The list of social media sites is able to be modified. The messages are sorted top to bottom in this embodiment based on the score for each message. As described herein, the score is calculated in some embodiments using a custom algorithm based on the risk, relevance and false positive rate of each word found in the message and the age of the message itself (based on when the message was retrieved from the social network API). In other embodiments, other metrics are used and these are provided merely by way of example. In some implementations, the scoring algorithm also includes a measure of the quantity of times the message is retransmitted (e.g., re-tweeted, etc.) in order to adjust the scores for retransmission. As an example, the score could be adjusted as the message is retransmitted, with a geometric algorithm that places less weight on retransmissions as the number of transmissions increases (e.g., message bins of 1-5, 6-20, 21-50, 51-100, etc.).

FIG. 1 further illustrates the use of color shading to indicate the age of a message. The figure shows three grades of gray-scale shading indicating the age of a message. In actual implementation, colors of the visible spectrum are utilized and the use of gray-scale is merely illustrated to provide how colors are utilized. One shade (heavy shading) is used for messages less than 20 minutes, one shade (medium shading) for messages older than 20 minutes but newer than 40 minutes, and a third shade (no shading) for messages older than 40 minutes and newer than 60 minutes. In other embodiments of the invention, different coloring schemes may be used; for example, a continuous color blend can be used such that a color is selected by generating a gradient from blue to red and a color is selected from that gradient by linearizing it over 120 minutes such that a message that is 40 minutes old would be the color ⅓ of the way across the gradient. A person skilled in the art will appreciate that there are a number of ways of embedding age information in the display and that the present invention is not limited to the examples recited above.

The table in FIG. 1 also shows an identifier for a user that posted the message. In an embodiment of the invention a user may hover their mouse over the identifier to see additional information about the user, such as their profile picture, a link to their profile, or other information. In an embodiment of the invention, similar or identical messages may be grouped together. For example, on Twitter® a message can be retweeted in large volumes resulting in the same message being posted by multiple users. In an embodiment of the invention, the first user to post a message is identified. In another embodiment, the most prominent user is selected. In yet another embodiment, the last user to post the message is selected. A list of all or a selection of the users posting the message may be displayed once the user moves the cursor over the user identifier. In an embodiment of the invention, the timing information for the message is based on the first post of the message. In another embodiment, the timing information is based on the time that the message was posted for the $100^{th}$ time. In some embodiments, the message can include metadata such as the identity of the poster, the age of the message, and the total score.

In summary, in an embodiment, each line in the interface can include, without limitation:

Message

Highlighted words of interest

Censored tags over censored words (this can be toggled)

The date/time the message was downloaded by SNOODA

The age in minutes of the message (current time minus the date/time the message came in)

Score (based on the scoring algorithm)

User ID of person who posted the message

Figure 3:
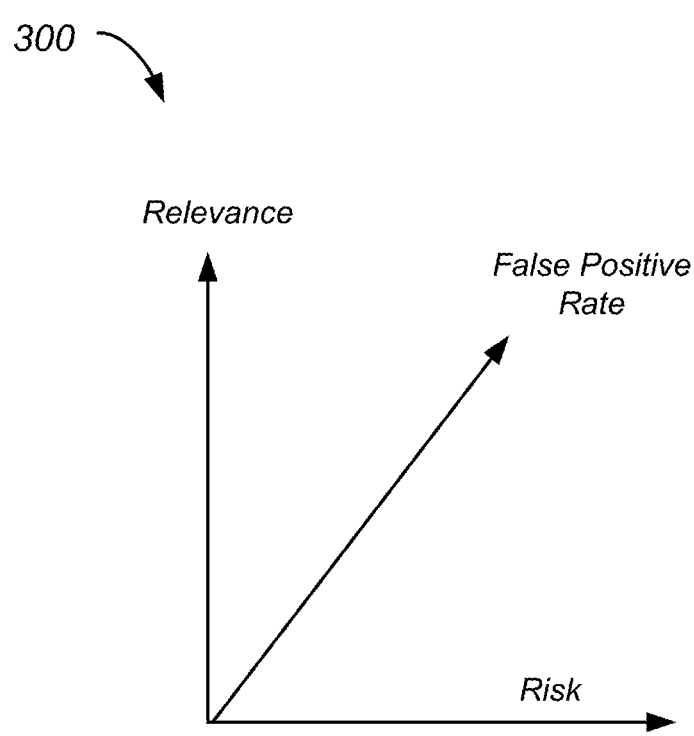
FIG. 3 is a high level plot illustrating a metric for a word according to an embodiment of the present invention.

The scoring algorithm enables the display of the most important messages that have been filtered from all message traffic. FIG. 3 illustrates a three-dimensional space of risk, relevance, and false positive rates, with values ranging from 1 to 10.

Table 1 illustrates metrics for different words of interest. For the word "breach," the risk is 9, the relevance is 1 and the false positive rate is 2. Although the word breach has meaning in a security context, it may appear in a message in the context of a whale breaching, which would have low significance for network security.

TABLE 1

| Word | Risk (Ri) | Relevance (Re) | False Positive Rate (FPR) | Get Word | Score Word |
|---|---|---|---|---|---|
| Breach | 9 | 1 | 2 | T | T |
| Botnet | 9 | 1 | 1 | T | T |
| Attack | 5 | 1 | 6 | F | T |

The column "Get Word" indicates if the word is suitable as a search word, which will be used to filter the network traffic and return messages including the search word. These words are also referred to as Search Words. Some words, which would produce too many false positives, are categorized as False in relation to "Get Word," for example, Attack. However, if a message is returned by the search, for instance, if the message contains the word Botnet, then the word Attack can be scored, that is, used in scoring the message. Thus, although Attack is not True for Get Word, it is true for Score Word, enabling the use of the word attack in the same message as other search words to impact the score for the message. The words in this second category of words can be referred to as a score word.

Thus, the set of messages is retrieved based on the words that are True for Get Word appearing in the message. During scoring, the message is scored, based on the search words that are True for Get Word as well as search words that are True for Score Word. Additionally, word augmentation may result in modification of the metrics prior to scoring of the message.

In a particular embodiment, a message is ranked by the scoring algorithm using the following formula:

$$Score = Ri*Re/FPR$$

where Ri is the Risk, Re is the Relevance, and FPR is the false positive rate.

If multiple words from the word list (e.g., a first word and a second word) are present in a message, then the formula can be modified as follows:

$$(Ri_1 + Ri_2) * \left[\left(\frac{Re_1}{FPR_1}\right) + \left(\frac{Re_2}{FPR_2}\right)\right]$$

where the subscript represents the word number (e.g., the first word and the second word) in the message.

According to an alternative embodiment, a message is ranked by the scoring algorithm using the following formula:

$$\text{Score} = Ri * Re * (1 - ((FPR - 1)/10))$$

where Ri is the Risk, Re is the Relevance, and FPR is the false positive rate.

If multiple words from the word list (e.g., a first word and a second word) are present in a message, then the formula for the alternative embodiment can be modified as follows:

$$\text{Score} = (Ri_1 + Ri_2) * ((Re_1 * (1 - ((FPR_1 - 1)/10))) + (Re_2 * (1 - (FPR_2 - 1)/10))))$$

where the subscript represents the word number (e.g., the first word and the second word) in the message.

Embodiments of the present invention enable observation and action in response to appearance of words in social media posts and messages, particularly words of interest to an entity or a group. For example, in network security, words like DDOS (distributed denial of service), breach, attack, key, and the like. Since some of these words are actually phrases, embodiments of the present invention consider phrases as words. Thus, the discussion related to words is also applicable to phrases.

Moreover, the search words found in the messages can be compared to other words in context to modify the Risk/Relevance/False Positive Rate ratings. For example, Anonymous is a name associated with a hacker group and it may be rated as 7/1/5. Thus, seeing anonymous in network traffic may be of concern. However, "Alcoholics Anonymous" would not likely be related to hackers or network security. Accordingly, the ratings can be augmented to reduce the impact of the combination of words. In this method, the relationship between words can be specified (e.g., immediately preceding, immediately following, within a certain number of words preceding/following, etc.). This augmentation would convert Anonymous (rated as 7/1/5) to Alcoholics Anonymous (rated as 1/1/1). As another example, "attack" can be rated as 5/1/4. The augmentation can raise the ratings, with "cyber attack" being rated as 8/1/1 as a result of the increased risk associated with this phrase. Thus, more accurate scoring is achieved in some embodiments through augmentation. In some embodiments, the words used in augmenting the score is referred to as a score word list.

Referring once again to FIG. 1, information on the originator of the message is provided for use by the system. In some implementations, additional information (e.g., attribution data) about the originator is obtained and displayed, including an IP address of the originator, lat/long of the post, real identity of the originator, biographical information on the originator, and the like. Some embodiments can extend this concept to supplement the rankings and the display results based on the identity, location, or other information related to the originator. As an example, if a post with a certain keyword is posted within a predetermined location of the keyword (e.g., within 50 miles of New York), the ranking of the search result including New York could be increased. One of ordinary skill in the art would recognize many variations, modifications, and alternatives.

The display of the messages can be truncated to save screen real estate, for example, to the 200 characters in the vicinity of the search words, the 500 characters in the vicinity, or the like. Duplicate user IDs can be deleted as appropriate to the particular application.

In the embodiment illustrated in FIG. 1, a word censoring feature is implemented that replaces words within the body of the message (e.g., expletives) with a [censored] tag. A list of censored words, including vulgar, obscene, or otherwise undesirable words can be maintained to support this functionality, which is optional. In some implementations, this censor feature can be toggled on and off as needed for the particular application and viewing audience. Some embodiments of the present invention implement word censoring without impacting other concurrent users. In an embodiment, as words are displayed in the interface, they can be added to the censored word list by right clicking on the word and indicating the word should be censored, or by other suitable techniques.

Referring once again to FIG. 1, the right column provides a display location for icons that indicate the source of the message (e.g., Facebook, Twitter, etc.). In the illustrated embodiment, the color of the icon is indicative of the temperature, or age, of the message. New messages are red or hot and they cool over time (turn blue). The age also factors into the scoring algorithm, so the score of each message decreased over time until it eventually drops off the board. In an embodiment, the score decreases linearly with time, for example, from an initial score at time zero to a value of zero after 120 minutes. The decrease with time does not have to be linear and other functions can be utilized to age the scores.

As an example of color coding, Table 2 provides an exemplary list of times and colors that can be utilized. These times and colors are merely exemplary and do not limit the times and colors that can be utilized by embodiments of the present invention.

TABLE 2

| Age (minutes) | R | G | B | Multiplier |
|---|---|---|---|---|
| 0-10 | 165 | 0 | 33 | 1.0 |
| 11-20 | 216 | 38 | 50 | .98 |
| 21-30 | 247 | 109 | 94 | .96 |
| 31-40 | 255 | 172 | 114 | .94 |
| 41-50 | 255 | 224 | 153 | .92 |
| 51-60 | 255 | 255 | 191 | .90 |
| 61-70 | 224 | 255 | 255 | .88 |
| 71-80 | 170 | 247 | 255 | .86 |
| 81-90 | 114 | 217 | 255 | .84 |
| 91-100 | 63 | 160 | 255 | .82 |
| 101-110 | 38 | 77 | 255 | .80 |
| 111-120 | 41 | 10 | 216 | .78 |

The bottom row provides a scrolling legend of the icons that can be displayed in the visual shorthand column, the right column, or other sections.

Embodiments of the present invention utilize a system, including one or more processors and one or more databases that retrieve messages based on keywords from various social network APIs, score the messages based on a custom calculation or algorithm, and then display them on the SNOODA user interface, ranked according to message score. The individual word scores and words that are utilized in performing the searches of the social network traffic are customized in one embodiment using an administrative page. The term database is properly understood to include any suitable type of data storage facility.

The systems and methods described herein can also be set up on a per-instance basis, meaning that there could be different analysis engines operating for different groups/departments, with each engine searching for only those words in which the particular group or department have an interest. Thus, customizing based on interest and value is a useful feature provided by embodiments of the present invention. The back-end systems are robust and scalable, allowing for additional words, sources, etc. to be added in a modular fashion.

Although some embodiments are described using a list of search words, retrieving messages from social network traffic based on the presence of these search words in the messages, embodiments of the present invention are not limited to this example. In other embodiments, all network traffic is retrieved and then filtered to select messages of interest, for example, messages including search words. One of ordinary skill in the art would recognize many variations, modifications, and alternatives.

Figure 2:
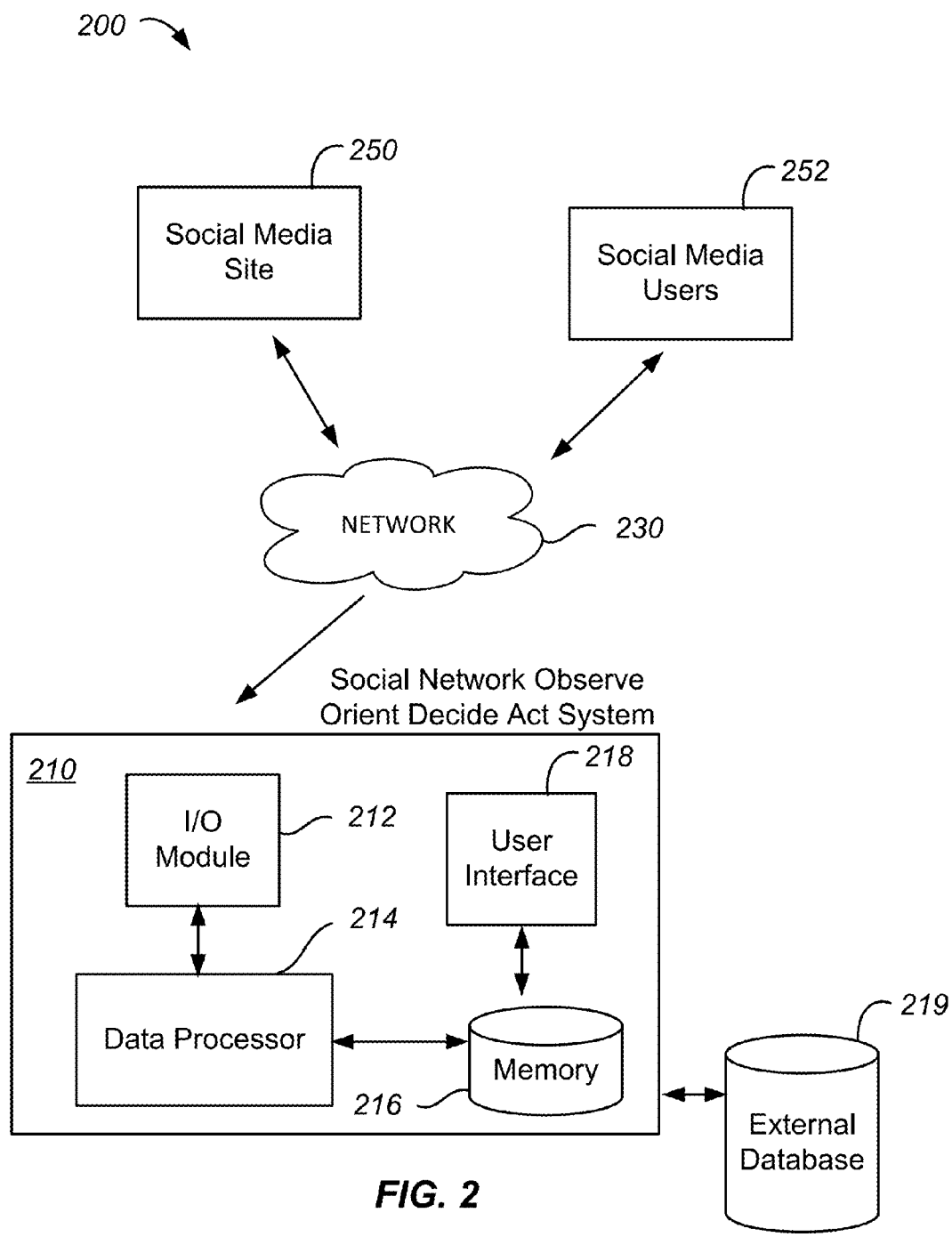
FIG. 2 illustrates a schematic diagram of a system for monitoring network traffic according to an embodiment of the present invention.

FIG. 2 illustrates a schematic diagram of a system for monitoring network traffic according to an embodiment of the present invention. The system includes a Social Network Observe Orient Decide Act (SNOODA) system 210 that includes in input/output module 212, a data processor 214, also referred to as a processor, a memory 216, and a user interface 218. An example user interface is illustrated in FIG. 1. The system 210 can have access to internal data stored in memory 216 as well as access to external data in external database 219.

It will be evident to one of skill in the art that the various functions performed by the processor described herein can be performed by a single processor, multiple processors, or combinations thereof. In some embodiments, the processing of information obtained from network traffic may be carried out using dedicated hardware such as an application specific integrated circuit (ASIC). In yet other embodiments, the processing may be carried out using a combination of software and hardware. As an example, such processors include dedicated circuitry, ASICs, combinatorial logic, other programmable processors, combinations thereof, and the like. Thus, processors as provided herein are defined broadly and include processors adapted to receive and process queries, search databases, determine scoring of messages, store and output results, perform communications functions, and the other functionality described herein.

The memory 216, also referred to as a storage device, represents one or more mechanisms for storing data. For example, the memory 216 may include read-only memory (ROM), random access memory (RAM), magnetic disk storage media, optical storage media, flash memory devices, and/or other machine-readable media. In other embodiments, any appropriate type of storage device may be used. Although only one memory 216 is shown, multiple storage devices and multiple types of storage devices may be present. Further, although the system 210 is drawn to contain the memory 216, it may be distributed across other computers, for example on the server.

The system 210 interacts with social media sites 250 through network 230. Social media users 252 can interact with the social media sites 250 through the network 230. Although it is possible that social media users 252 can communicate with system 210 through network 230, some embodiments prevent user interaction as illustrated by the single-sided arrow between network 230 and system 210.

Figure 4:
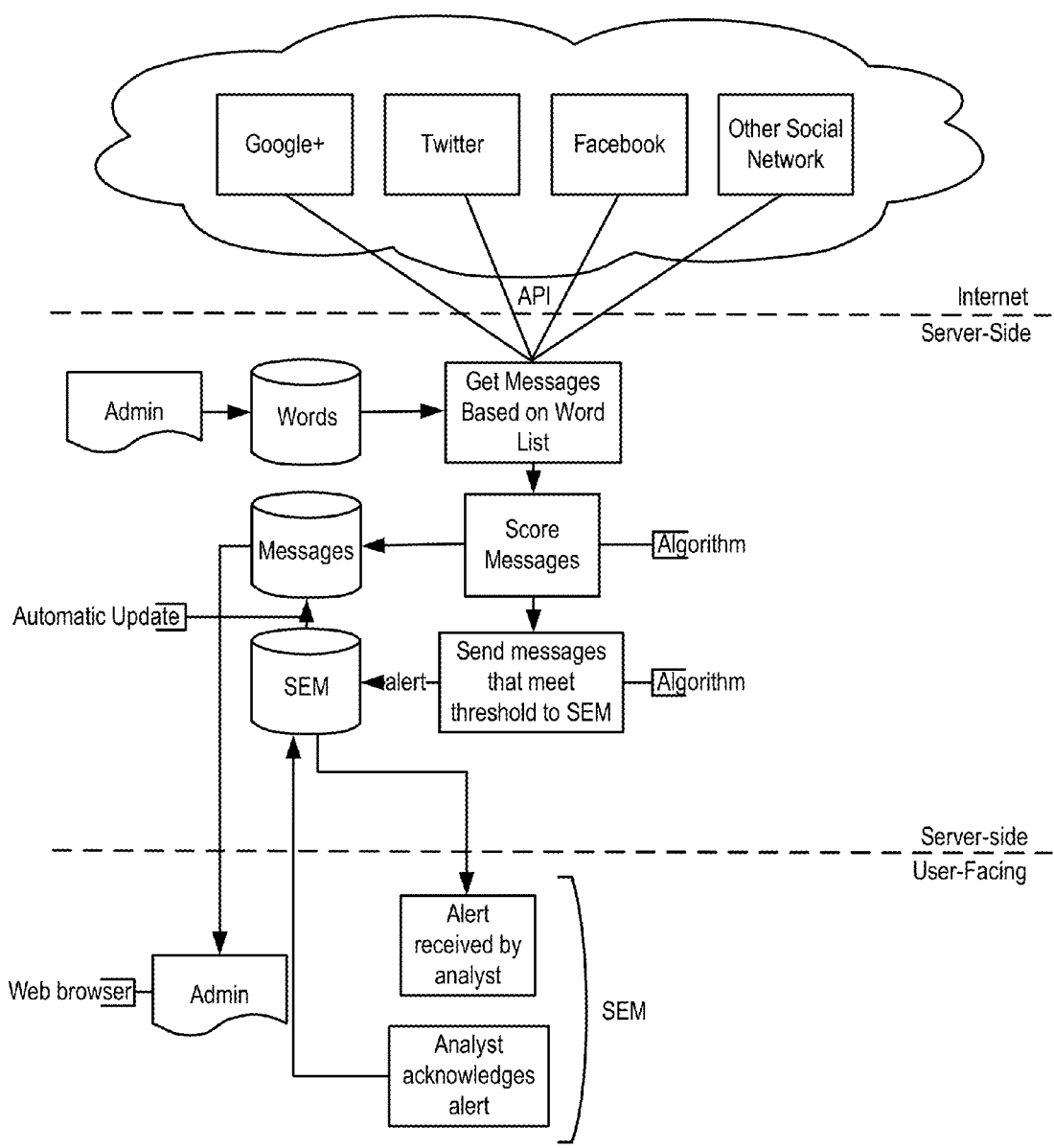
FIG. 4 is a high level flowchart illustrating a method of monitoring network traffic according to an embodiment of the present invention.

FIG. 4 is a high level flowchart illustrating a method of monitoring network traffic according to an embodiment of the present invention. As illustrated in FIG. 4, multiple sources can be used to provide data for embodiments of the present invention, including social networks such as Google+, Twitter, Facebook, and other social networks. Embodiments of the present invention are not limited to social networks and can include email traffic, news stories, other internet content, and the like. An API is used to pull messages from the network traffic.

The API call may be a request for information publicly available on the social network. In other embodiments, private access to the social networks is enabled, potentially providing access to an increased volume of message traffic. In an embodiment of the invention, the query is made using the Facebook Query Language (FQL), but a number of other APIs may also be used. In another embodiment, the API call may include an identifier or token giving access to additional information about one or more users. For example, a user can authorize access to specific information relating to their profile. In yet another embodiment, the API call may relate to privately negotiated access to data relating to the social network. For example, the API call may be a call to obtain all messages sent on Twitter® between two points in time, or a request to obtain messages sent on Twitter® in real-time as they are posted. In some implementations, all traffic on a particular social network site can be obtained and then searched for keywords depending on data bandwidth and storage availability.

The server includes processors and memory operable to obtain messages based on word lists, score the messages that are returned, and send messages that meet a threshold to a processing system (e.g., a Security Event Manager (SEM)) for further analysis. In some implementations, after further analysis, feedback is provided to automatically update the set of messages of interest.

Using the output provided by the server, information is displayed on a user interface such as a graphical user interface. Additionally, alerts can be generated by the server and sent to analysts, who can then analyze the messages for security or other purposes. Additionally, feedback mechanisms are provided as appropriate to the particular application.

Figure 5:
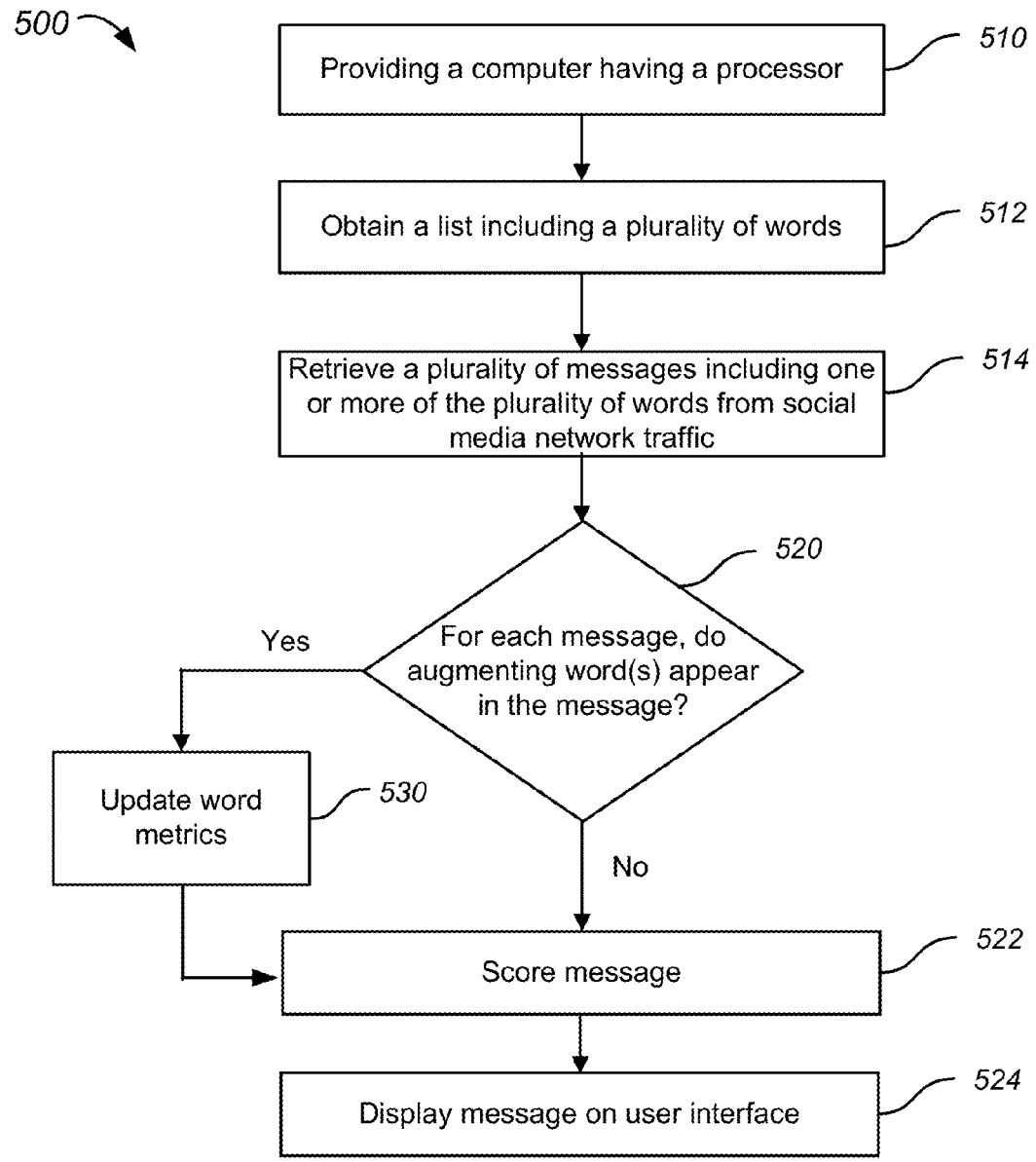
FIG. 5 is a high level flowchart illustrating another method of monitoring network traffic according to an embodiment of the present invention.

FIG. 5 is a high level flowchart illustrating another method of monitoring network traffic according to another embodiment of the present invention. The method 500 includes providing a processor (510) and obtaining a list including a plurality of words (512), which can be referred to as a search word list. Each word in the list has a metric associated therewith. As an example, the metric can be related to the risk, relevance, and false positive rate of the word. In referring to a plurality of words, the individual words can be defined to include a phrase. Thus, "Distributed Denial of Service," DDOS, and "DDOS Attack," are all considered words.

The method also includes querying network traffic to obtain a set of messages including one or more of the plurality of words (514). The network traffic can include traffic on a social network site. Using the processor, the messages in the set of messages are scored (522). In an embodiment in which the metric for the words relates to relevance, and false positive rate, the scoring of the messages can include computing risk times relevancy times one minus false positive rate minus one divided by ten to provide a score for the message including the word. If multiple search words appear in the message, variants of this scoring algorithm can be used. Scoring of the message can include scoring based on words that are True for "Score Word" but False for "Get Word." Thus, although a message may be returned as a result of the presence of a search word, the scoring of the message can account for other words of interest in the message (typically words that are too common to provide useful search results The method also includes displaying the messages, ranked by score, in a user interface (524). Over time, the score is decreased in some embodiments to reduce the importance of the message as a function of time.

In an embodiment, the method additionally includes, prior to scoring the messages, providing an augmented word list including a plurality of augmenting words, which can be referred to as a score word list, determining if an augmenting word appears in the message (520), and modifying the metric for the word associated with the augmenting word (530). Thus, words like Anonymous can have their metric redefined when the word Anonymous is augmented with Alcoholics. In FIG. 5, processes 520 and 530 are illustrated as optional. In some embodiments, scoring (522) is performed prior to process 520 and then the scoring is updated after processes 520 and 530 are performed. One of ordinary skill in the art would recognize many variations, modifications, and alternatives.

As an example, all messages for a social network site in a predetermined time, for example, one minute, two minutes, or the like could be retrieved. The messages will be searched to determine if any of the search words (words marked True for Get Word or Search Word) appear in the messages. If the search words appear in the message, then the messages are scored as described herein. Thus, embodiments of the present invention are not limited to only obtaining messages including search words. Additionally, although ranking of messages can be automated as described herein, input from analysts can be used to modify the rankings, either increasing or decreasing them as appropriate. The graphical user interface could be modified to include an indication that a message had been sent, either automatically or manually, to an analyst for review, the disposition after review, or the like. As an example, the background of the message could be modified to indicate that the message is under review.

After a predetermined time period, for example, two minutes, the search queries can be rerun, pulling additional messages including the search words that are True for Get Word. These new messages can be scored and the display list can be updated to include the new messages along with the legacy messages already on the display list. As the legacy messages age, their scores will decrease, impacting their score and thus the sort order in the display list. Accordingly, if there are two messages with the same score, the newer message would have a higher ranking in the display list.

An embodiment of the invention provides a method for providing a list of suspect social network profiles. The method may include receiving a list of names of people to monitor. The list may include names of employees of an organization such as executives or vice presidents. In another embodiment, the list of names may include organization names or product names. Furthermore, the method may include sending a request to at least one social network including at least one name from the list. The request may include the full name for each entry, or alternatives for some of the names. For example, the query may include only the last name and various permutations of the last name of a person to obtain a larger set of results.

In response to the request information from the social network including a plurality of profile identifiers may be received. For example, when querying for John Smith, a large number of profiles may be received. The method may then furthermore include analyzing the list to determine a subset of the suspect profiles. For example, only profiles identified as relating to users in the United states may be selected or only profiles indicating a particular age-range may be selected. Finally, a list including information about the suspect profiles may be displayed on a console or as a list. An operator may then manually further analyze the profiles to determine whether they are impersonating a person identified on the list. An example of such a console or graphical user interface is shown in FIG. 7.

FIG. 7 shows a table of suspected social network profiles. The table includes an ID 714 for each profile, as well as a username, a first name, a last name, a status (e.g., a disposition status), and comments. The comments can be added by a system operator. Although not illustrated in FIG. 7, additional data, including an ID for the person entering the disposition status can be displayed as well as a disposition date and time. Filtering functions can be provided as will be evident to one of skill in the art.

Furthermore, a picture 710 associated with each profile is shown in the interface. Additionally, an icon 712 representing the social network corresponding to the profile is displayed. In an embodiment of the invention, additional information may be shown about the profile when a mouse cursor is moved over the profile image. For example, the image may be magnified or additional data elements may be shown as appropriate. Furthermore, a link to a third party data source, such as Spokeo, may be shown, which can be used to access more information on the profile. Additionally, in some embodiments, the social network prolife can be accessed by clicking on one or more of the entries illustrated in FIG. 7.

In a specific embodiment, a method of analyzing social media profiles is provided. The method includes providing a list of identities, requesting a list of social media profiles matching at least one of the list of identities, and receiving the matching list. The social media profiles can be accounts on a social network site. The method also includes comparing the profiles in the matching list to a set of known profiles and determining that at least one of the profiles in the matching list is fraudulent. The method further includes displaying information related to one or more of the matching profiles in a graphical user interface. An exemplary graphical user interface is illustrated in FIG. 7.

Figure 8:
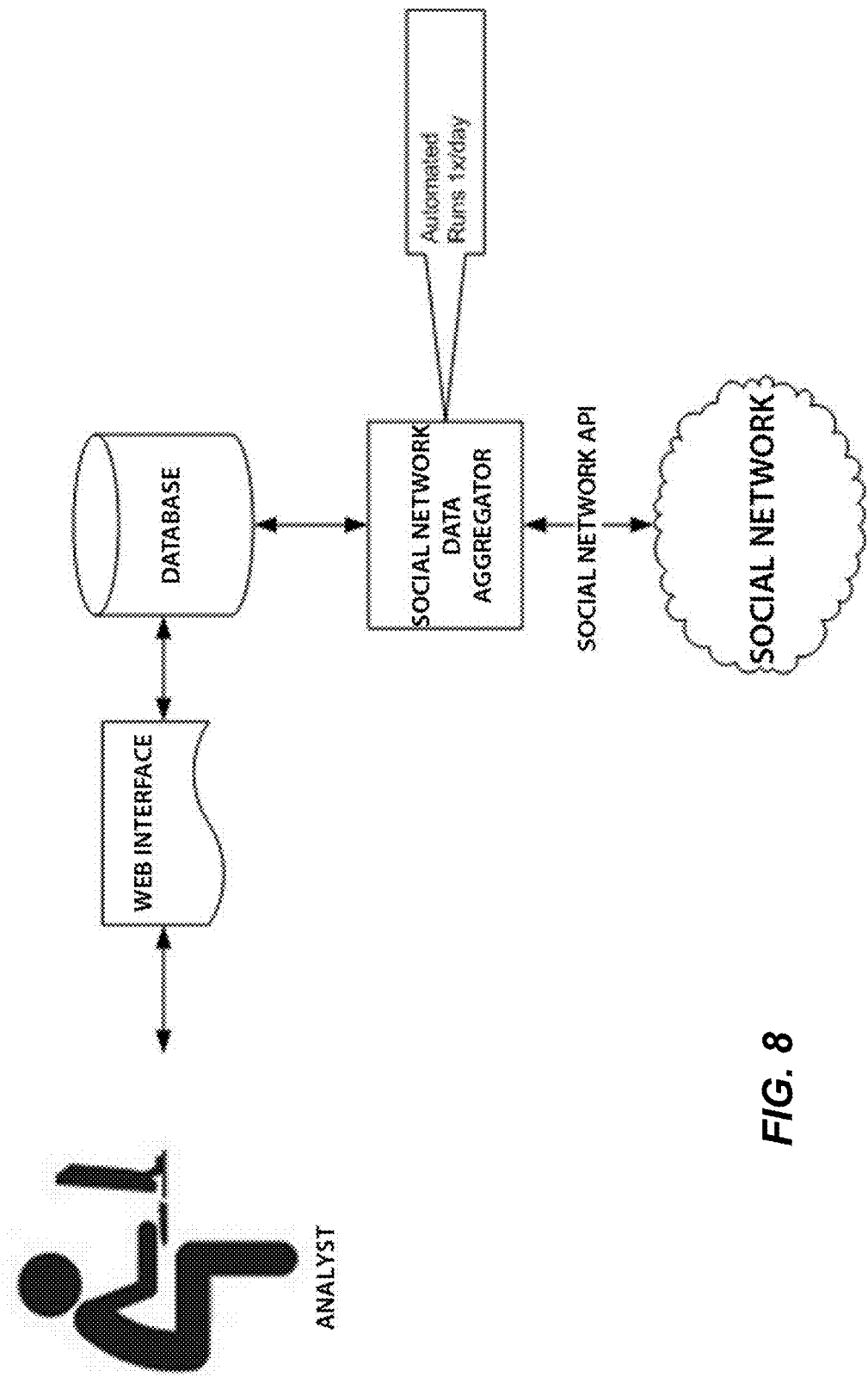
FIG. 8 illustrates a schematic diagram of a system for monitoring social network profiles according to an embodiment of the present invention.

FIG. 8 illustrates a schematic diagram of a system for monitoring social network profiles according to an embodiment of the present invention. The diagram shows a social network aggregator receiving periodic updates from a social network via a social network API. The social network aggregator may receive data from a single social network or multiple social networks. The aggregator may further verify the names of profile information received against a list of names to monitor for. If a match is found, the profile may be stored in a database. A web interface, such as the one shown in FIG. 7, may access the database to provide an interface for an analyst for further determine the action to take.

Once the analyst has made a decision on the action to take, they may be presented with a user interface like the one shown in FIG. 9. The analyst may enter a new status and some comments. The status may include "Benign" for profiles determined to not be malicious or false. Furthermore, a status of "Private" may be assigned for profiles where insufficient information to perform the required analysis is available. For example, a profile ID and the corresponding name may appear in a post on a social network for a profile whose user has restricted access to certain users. Furthermore, a status of "Issue" may be assigned to profiles that are deemed to be false or malicious, and require further action. The interface may also prompt the analyst for an ID to identify who made the classification. In another embodiment this ID is filled in automatically based on the logon data of the analyst or other session information.

Figure 6:
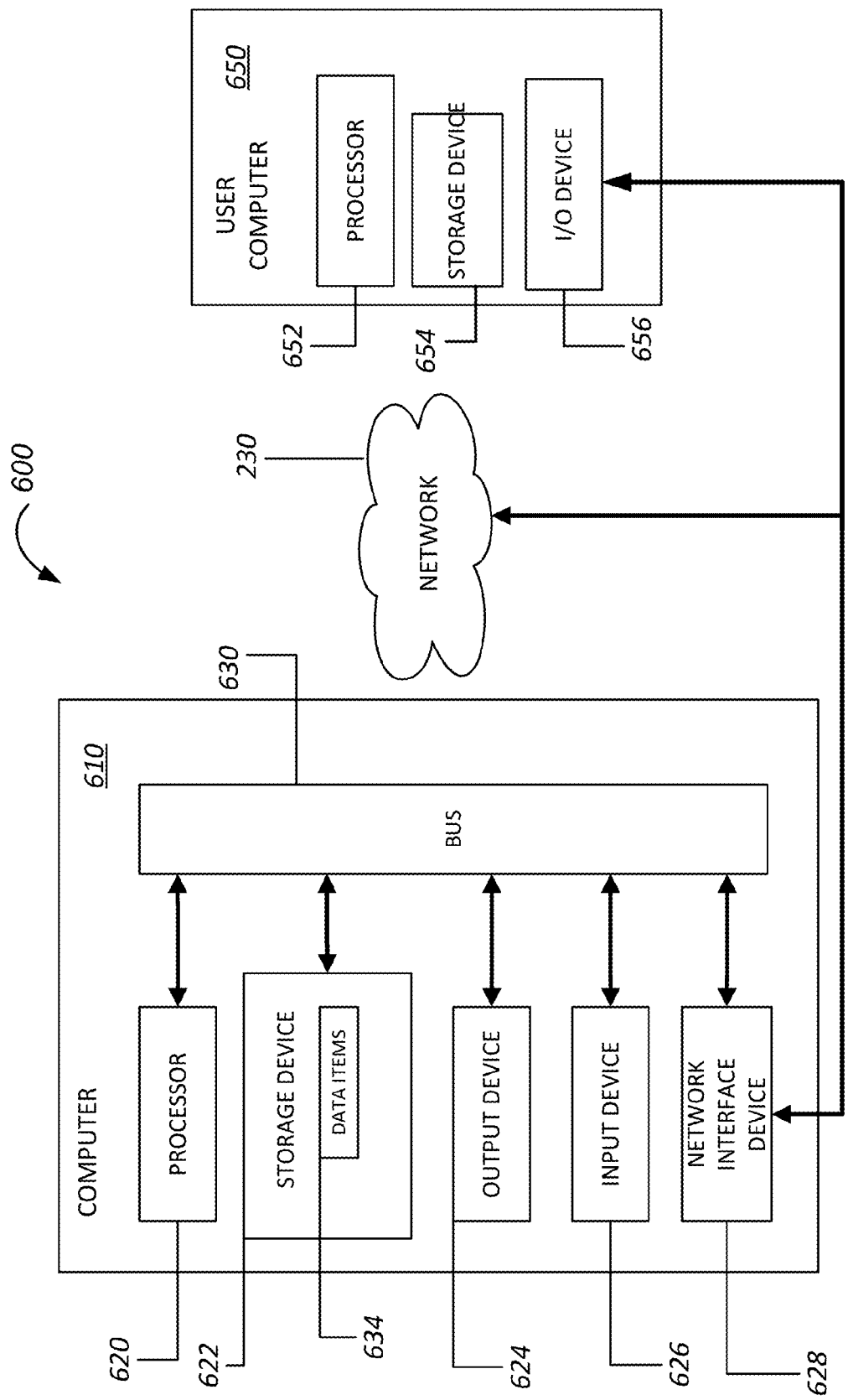
FIG. 6 is a high level schematic diagram illustrating a computer system including instructions to perform any one or more of the methodologies described herein.

FIG. 6 is high level schematic diagram illustrating a computer system including instructions to perform any one or more of the methodologies described herein. A system 600 includes a computer 610 connected to a network 230. The computer 610 includes a processor 620 (also referred to as a data processor), a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 230 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which is not necessary to understand the invention.

Although the controller and the data items 634 are shown to be within the storage device 622 in the computer 610, some or all of them may be distributed across other systems, for example on a server and accessed via the network 230.

The output device 624 is that part of the computer 610 that displays output to the user. The output device 624 may be a liquid crystal display (LCD) well-known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 230 through any suitable communications protocol. The network interface device 628 sends and receives data items from the network 230.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), mobile phones, pocket computers, tablets, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 230 may be any suitable network and may support any appropriate protocol suitable for communication to the computer 610. In an embodiment, the network 230 may support wireless communications. In another embodiment, the network 230 may support hard-wired communications, such as a telephone line or cable. In another embodiment, the network 230 may support the Ethernet IEEE (Institute of Electrical and Electronics Engineers) 802.3x specification. In another embodiment, the network 230 may be the Internet and may support IP (Internet Protocol). In another embodiment, the network 230 may be a local area network (LAN) or a wide area network (WAN). In another embodiment, the network 230 may be a hotspot service provider network. In another embodiment, the network 230 may be an intranet. In another embodiment, the network 230 may be a GPRS (General Packet Radio Service) network. In another embodiment, the network 230 may be any appropriate cellular data network or cell-based radio network technology. In another embodiment, the network 230 may be an IEEE 802.11 wireless network. In still another embodiment, the network 230 may be any suitable network or combination of networks. Although one network 230 is shown, in other embodiments any number of networks (of the same or different types) may be present.

A user computer 250 can interact with computer 610 through network 230. The user computer 250 includes a processor 252, a storage device 254, and an input/output device 256. The description related to processor 620 and storage device 622 is applicable to processor 252 and storage device 254. As an example, the user computer 250 can be a personal computer, laptop computer, or the like, operated by a member of a membership organization (e.g., the present assignee). Using the user computer 250, the member can then interact with computer 610 operated by the present assignee through network 230 in order to access the present assignee's web pages or the like.

The embodiments described herein may be implemented in an operating environment comprising software installed on any programmable device, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

As described herein, SNOODA Persona Non Grata may be implemented in conjunction with Social Media Users 252. SNOODA Persona Non Grata is a social network monitoring tool (that may be provided as a separate tool) that focuses on monitoring profiles of people with names identical to VIPs. One benefit provided by SNOODA Persona Non Grata is the reduction or prevention of identity fraud. Embodiments of the present invention thus provide a suite of tools including SNOODA Messages as described herein and SNOODA Persona Non Grata among other tools.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of monitoring network traffic, the method comprising:
    obtaining, by one or more processors, a list including a plurality of words, each word having at least two metrics associated therewith, the plurality of words comprising one or more words that are each identified as a search word and a score word, and one or more words that are each identified as a non-search word and a score word;
    transmitting, by the one or more processors, respective requests to a plurality of computer-implemented social networks through respective application program interfaces (APIs) over a network, the respective requests each only including at least one search word in the list;
    receiving, by the one or more processors, a set of messages comprising at least one message from each of the plurality of computer-implemented social networks, each message in the set of messages comprising a message distributed through a respective computer-implemented social network and at least one search word in the list;
    scoring, by the one or more processors, each message in the set of messages based on respective two or more metrics of at least one search word and any non-search words provided in respective messages to provide respective scores; and
    providing, by one or more processors, the messages for display in a rank order by score in a user interface.

2. The method of claim 1 further comprising, prior to scoring the messages:
    providing an augmented word list including a plurality of augmenting words;
    determining that an augmenting word appears in a message; and
    modifying at least one metric for the word associated with the augmenting word.

3. The method of claim 1 further comprising decreasing the score as a function of time.

4. The method of claim 1 wherein one or more of the plurality of words comprises a phrase.

5. The method of claim 1 wherein the at least two metrics comprise three metrics related to risk, relevance, and false positive rate.

6. The method of claim 5 wherein scoring the messages comprises computing risk times relevance divided by false positive rate.

7. The method of claim 1 wherein scoring the message comprises scoring based on at least one word that appears on both a search word list and a score word list.

8. A non-transitory computer-readable storage medium coupled to one or more processors and having instructions stored thereon which, when executed by the one or more processors, cause the one or more processors to perform operations comprising:
    obtaining a list including a plurality of words, each word having at least two metrics associated therewith, the plurality of words comprising one or more words that are each identified as a search word and a score word, and one or more words that are each identified as a non-search word and a score word;
    transmitting, by the one or more processors, respective requests to a plurality of computer-implemented social networks through respective application program interfaces (APIs) over a network, the respective requests each only including at least one search word in the list;
    receiving, by the one or more processors, a set of messages comprising at least one message from each of the plurality of computer-implemented social networks, each message in the set of messages comprising a message distributed through a respective computer-implemented social network and at least one search word in the list;
    scoring, by the one or more processors, each message in the set of messages based on respective two or more metrics of at least one search word and any non-search words provided in respective messages to provide respective scores; and
    providing, by one or more processors, the messages for display in a rank order by score in a user interface.

9. The computer-readable storage medium of claim 8, wherein operations further comprise, prior to scoring the messages:
    providing an augmented word list including a plurality of augmenting words;
    determining that an augmenting word appears in a message; and
    modifying at least one metric for the word associated with the augmenting word.

10. The computer-readable storage medium of claim 8, wherein operations further comprise decreasing the score as a function of time.

11. The computer-readable storage medium of claim 8 wherein one or more of the plurality of words comprises a phrase.

12. The computer-readable storage medium of claim 8 wherein the at least two metrics comprise three metrics related to risk, relevance, and false positive rate.

13. The computer-readable storage medium of claim 12 wherein scoring the messages comprises computing risk times relevance divided by false positive rate.

14. The computer-readable storage medium of claim 8 wherein scoring the message comprises scoring based on at least one word that appears on both a search word list and a score word list.

15. A system, comprising:
   a computing device; and
   a computer-readable storage device coupled to the computing device and having instructions stored thereon which, when executed by the computing device, cause the computing device to perform operations comprising:
      obtaining a list including a plurality of words, each word having at least two metrics associated therewith, the plurality of words comprising one or more words that are each identified as a search word and a score word, and one or more words that are each identified as a non-search word and a score word;
      transmitting, by the one or more processors, respective requests to a plurality of computer-implemented social networks through respective application program interfaces (APIs) over a network, the respective requests each only including at least one search word in the list;
      receiving, by the one or more processors, a set of messages comprising at least one message from each of the plurality of computer-implemented social networks, each message in the set of messages comprising a message distributed through a respective computer-implemented social network and at least one search word in the list;
      scoring, by the one or more processors, each message in the set of messages based on respective two or more metrics and of at least one search word and any non-search words provided in respective messages to provide respective scores; and
      providing, by one or more processors, the messages for display in a rank order by score in a user interface.

16. The system of claim 15, wherein operations further comprise, prior to scoring the messages:
   providing an augmented word list including a plurality of augmenting words;
   determining that an augmenting word appears in a message; and
   modifying at least one metric for the word associated with the augmenting word.

17. The system of claim 15, wherein operations further comprise decreasing the score as a function of time.

18. The system of claim 15 wherein one or more of the plurality of words comprises a phrase.

19. The method of claim 1, wherein at least one word in the word list includes respective metrics indicating that the at least one word is not used in a request to a social networking service and is used to determine a score of a respective message responsive to the request, if the at least one word is included in the respective message.

* * * * *